(12) United States Patent
Howard et al.

(10) Patent No.: US 6,748,465 B2
(45) Date of Patent: Jun. 8, 2004

(54) LOCAL BUS POLLING SUPPORT BUFFER

(75) Inventors: John S. Howard, Portland, OR (US); Brad Hosler, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 220 days.

(21) Appl. No.: 09/968,073

(22) Filed: Sep. 28, 2001

(65) Prior Publication Data
US 2003/0070031 A1 Apr. 10, 2003

(51) Int. Cl.[7] ............................................. G06F 13/00
(52) U.S. Cl. ........................... 710/36; 710/46; 710/52; 711/147; 711/165; 713/320; 713/330
(58) Field of Search ................................ 710/1, 36, 46, 710/52; 711/147, 165; 713/320, 330

(56) References Cited

U.S. PATENT DOCUMENTS

| 4,698,748 | A | * | 10/1987 | Juzswik et al. | ............. | 713/322 |
| 5,293,602 | A | * | 3/1994 | Fukagawa et al. | .......... | 711/147 |
| 6,141,726 | A | * | 10/2000 | Dell | ........................... | 711/103 |

* cited by examiner

Primary Examiner—Rehana Perveen
(74) Attorney, Agent, or Firm—Blakley, Sokoloff, Taylor & Zafman LLP

(57) ABSTRACT

A method and apparatus for allowing memory, cache and/or a processor to remain powered down while repetitive transactions are carried out on an I/O bus and actions are taken in response to feedback received from I/O devices coupled to the I/O bus.

28 Claims, 3 Drawing Sheets

LOCAL BUS POLLING SUPPORT BUFFER

FIELD OF THE INVENTION

The present invention is related to hardware used to support the polling of devices on a bus.

ART BACKGROUND

Reducing power consumption by computer systems has become of increasing importance in recent years to satisfy increasing demands of users to reduce operating costs or to provide longer operating times in the case of portable computer systems. However, the goal of reducing power consumption has come into ever greater conflict with the goal of providing increasingly more flexible support for an ever greater array of I/O devices as more and more measures have been taken to reduce power consumption by "powering down" more and more of the components that comprise a typical computer system.

Numerous measures have been taken to power down ever more of the circuitry comprising a computer system whenever various degrees of inactivity seem to provide opportunities to do so. However, where it is intended that a computer system is to remain responsive enough to a user or other stimuli such that components that have been powered down are able to be powered up again when needed, a need remains to have at least some portion of the circuitry remain active to enable such a response.

One measure to reduce power entails powering down at least a portion of the processor used in a computer system, especially where the processor is likely to consume a large proportion of the power consumed by the whole computer system. In support of allowing the processor to power down and remain powered down for longer periods of time, one or more I/O devices may be configured to operate under the control of controlling circuitry capable of operating independently of the processor to perform one or more minor tasks in support of the I/O devices.

Some of such minor tasks in support of I/O devices require the controlling circuitry to make accesses to memory shared between the controlling circuitry and the processor. Controlling circuitry capable of making such accesses to such memory are often referred to as "bus masters," because making such an access to such memory usually requires gaining control of a memory bus that both the processor and the bus master share to obtain such access.

In some computer systems, the support of one or more I/O devices requires the repetitive polling of I/O devices to obtain status at frequent intervals by such an I/O bus master. This polling may further require repetitive accesses by the I/O bus master to the memory, and this prevents the memory from being powered down at times when it otherwise could be. Also, where a computer system also includes a cache maintained by the processor, such repetitive accesses by the I/O bus master to the memory may also prevent the processor from being powered down when it otherwise could be so that the processor may perform operations required to maintain cache coherency with the contents of the memory in response to the I/O bus master's accesses.

A need exists to reduce the frequency of accesses by such an I/O bus master in support of polling I/O devices.

BRIEF DESCRIPTION OF THE DRAWINGS

The objects, features, and advantages of the present invention will be apparent to one skilled in the art in view of the following detailed description in which.

DETAILED DESCRIPTION

In the following description, for purposes of explanation, numerous details are set forth in order to provide a thorough understanding of the present invention. However, it will be apparent to one skilled in the art that these specific details are not required in order to practice the present invention.

The present invention concerns achieving reductions in power consumption by a computer system having an I/O bus master that repetitively polls one or more I/O devices. Specifically, an embodiment of the present invention concerns incorporating a local buffer into an I/O bus master to reduce repetitive accesses to a memory within a computer system. However, although the present invention is discussed in reference to I/O devices coupled to a computer system in which components are powered down at various times to reduce power consumption, it is also applicable to other devices coupled to other electronic systems in which other measures are also used to reduce power consumption.

Figure 1:
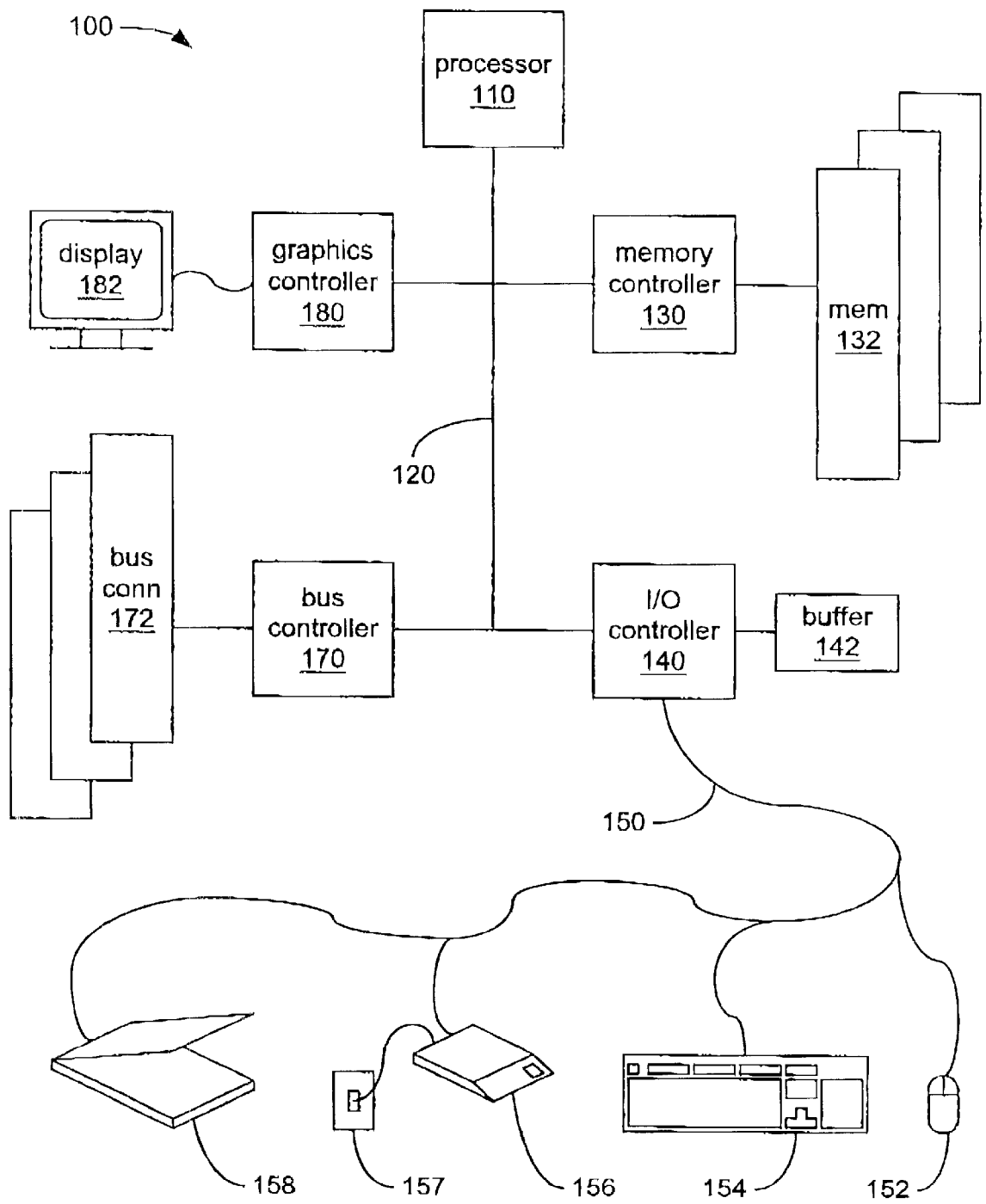
FIG. 1 is a block diagram of one embodiment of the present invention.

FIG. 1 depicts a block diagram of one embodiment of the present invention in the form of computer system 100. Processor 110 is coupled via local bus 120 to memory controller 130, I/O controller 140, bus controller 170 and graphics controller 180. Memory controller 130 is further coupled to memory 132, I/O controller 140 is further coupled to both buffer 142 and I/O bus 150, bus controller 170 is further coupled to bus connectors 172, and graphics controller 180 is further coupled to display 182. In turn, I/O bus 150 couples I/O controller 140 to various I/O devices or a wide variety, but which have been depicted in FIG. 1 to include mouse 152, keyboard 154, modem 156 (which is further coupled to phone jack 157), and scanner 158.

In one embodiment, local bus 120 directly couples processor 110, memory controller 130 and I/O controller 140, and is implemented as a set of conductors on a printed circuitboard coupling processor 110, memory controller 130 and I/O controller 140 which are each implemented in the form of separate integrated circuits attached to the circuitboard. In another embodiment, memory controller 130 is implemented as a portion of a larger integrated circuit that is interposed between processor 110 and I/O controller 140, which are also separate integrated circuits, and dividing local bus 120 into a pair of separate busses. In this embodiment, this larger integrated circuit performs one or more other functions which may include providing still another separate bus by which graphics controller 180 is coupled. In still another embodiment, memory controller 130 and I/O controller 140 are implemented as portions of the same larger integrated circuit, and local bus 120 couples processor 110 to the larger integrated circuit.

Memory 132 is a form of random access memory (RAM) of one of many commonly available varieties of semiconductor memory technology. Memory controller 130 may be designed to provide an interface to one or more memories in addition to memory 132, such as a form of nonvolatile memory (not shown) for storage of program code that is desired to remain intact regardless of whether computer system 100 is supplied with power or not.

I/O controller 140 provides an interface between I/O devices coupled to I/O bus 150 and the rest of computer system 100. In various embodiments, I/O controller 140 may be a microprocessor, microcontroller or sequencer executing a sequence of instructions. During normal operation of I/O bus 150, I/O controller 140 repetitively performs a transaction on I/O bus 150 such as polling I/O devices coupled to I/O bus 150. Data concerning each of the I/O devices coupled to I/O bus 150 is maintained within memory 132, thereby making it accessible to processor 110, and at least a portion of this data needs to be accessed by I/O controller 140 in performing this repetitive polling or other repetitive transaction. However, buffer 142 maintains a copy of a subset of this data.

In one embodiment, the copy of data maintained by buffer 142 may be comprised of information concerning the status of one or more I/O devices coupled to I/O bus 150 and/or information concerning appropriate actions to be taken in response to various types of feedback provided by one or more I/O devices coupled to I/O bus 150 being polled by I/O controller 140. In this embodiment, the copy of data may be sufficient to allow I/O controller 140 to perform polling of I/O devices coupled to I/O bus 150 and to take appropriate actions in response to a polled I/O device indicating that nothing has changed without I/O controller 140 accessing memory 132. Alternatively, in this embodiment, the data may be sufficient to allow I/O controller 140 to take appropriate actions in response to a select number of possible indications of change of status provided by an I/O device that has been polled without I/O controller 140 accessing memory 132. Maintaining a copy of data concerning I/O devices coupled to bus 150 in buffer 142 allows the number accesses that I/O controller 140 makes to memory 132 to be reduced, which may, in turn, allow memory 132 to be powered down at times where it would otherwise have to be powered up to allow I/O controller 140 to make such accesses.

In one embodiment, the copy of data maintained by buffer 142 is comprised of a schedule specifying either when or the interval of time at which one or more transactions are to be carried out by I/O controller 140 on I/O bus 150. In this embodiment, the schedule may be subdivided into individual cells, each meant to correspond to at least a subpart of an I/O device coupled to I/O bus 150 or to a transaction that is to be carried out involving at least a subpart of an I/O device. In one variation of this embodiment, information contained within each cell may be just what is necessary for I/O devices coupled to I/O bus 150 to simply be polled by way of I/O controller 140 initiating transactions at times or at intervals dictated by the schedule that request I/O devices to transmit only feedback on their status. In this variation, the receipt of feedback indicating that there has been no change in status would result in I/O controller 140 taking little more in the way of action than initiating another transaction at whatever time or whatever interval is dictated by the schedule, and no access would be made to memory 132. However, in this variation, the receipt of feedback indicating that a change in status of an I/O device coupled to I/O bus 150 has occurred, or that an I/O device coupled to I/O bus 150 requires data or has data to send to I/O controller 140 may result in I/O controller 140 accessing memory 132, unless buffer 142 can in some way be used in lieu of memory 132.

More specifically, in this one embodiment, each cell may contain information referring to an identifier used to distinguish between I/O devices coupled to I/O bus 150, where I/O bus 150 is implemented in such a way that makes use of such identifiers. Table 1 depicts one possible example of such a cell. As shown, each cell may contain a device address comprised of a number of bits supplying a device address that would be unique to each I/O device coupled to I/O bus 150.

TABLE 1

| device address | 7 bits |
|---|---|
| endpoint number | 4 bits |
| split transaction state | |
| hub address | 7 bits |
| TT number | 7 bits |
| start mask | 8 bits |
| complete mask | 8 bits |
| splitxstate | 1 bit |
| s-bytes | 7 bits |
| frame tag | 5 bits |
| data toggle | 1 bit |
| valid flag | 1 bit |
| endpoint speed | 2 bits |

Referring to Table 1, where each I/O device has subparts that may be separately accessed via I/O bus 150, each cell may be comprised of a number of bits identifying the specific subpart or "endpoint" to accessed with a given transaction. If I/O bus 150 is of a type that employs hubs or bridge devices to extend the physical length of I/O bus 150, to allow a plurality of I/O devices to be coupled to I/O bus 150, or to couple sections of I/O bus 150 that operate with different characteristics, then a cell may be comprised of a number of bits identifying a hub through which a given I/O device must be accessed for a given transaction. A way of recovering from data errors may be implemented using a data toggle bit, toggled between 0 and 1, as part of protocol for recovering from instances of lost data and/or lost status information. Alternatively, other widely known forms of error checking and/or recovery may be used. A cell may be comprised of a bit serving as a valid flag used to indicate whether or not the contents of the cell are valid for use in performing one or more transactions. Furthermore, one or more bits may be used to indicate the speed at which a transaction involving an I/O device coupled to I/O bus 150 or a subpart (or endpoint) of that device may be carried out.

Referring again to Table 1, the presence of a hub or bridge device between I/O controller 140 and an I/O device coupled to I/O bus 150 may necessitate the use of multiple transactions on the portion of I/O bus 150 to which I/O controller 140 is coupled in order to perform and complete a single transaction on the portion of I/O bus 150 to which the I/O device is coupled. This could arise where the portion of I/O bus 150 to which the I/O device is coupled operates with electrical characteristics or with a speed or protocol that differs from the portion to which I/O controller 140 is coupled. I/O controller 140 may be required to transmit an initial command to the hub and then wait an extended period for the command to be retransmitted by the hub or bridge device to the I/O device and for the I/O device to respond. I/O controller 140 may either perform other transactions on the portion of I/O bus 150 to which I/O controller 140 is coupled and/or repeatedly poll the hub to determine if the hub has yet received a response from the I/O device. Table 1 depicts one possible implementation of bits that may be used in support of split transactions, including: transaction translator (TT) bits to identify one or more specific pieces of translation logic within the hub or bridge device to be used between the two portions of I/O bus 150, start mask and complete mask bits used by I/O controller 140 to determine when within an interval of time (called a "frame") to expect to begin and complete the split transaction, a splitxstate bit used by I/O controller 140 to manage and/or track the start or complete phases of a split transaction, s-bytes bits providing a count of the number of bytes transferred in a given split transaction, and frame tag bits to provide error detection in the event that a malfunction causes I/O controller 140 to somehow not issue the proper bus transactions comprising the split transaction at the proper time to finish the completion phase of a split transaction.

In another embodiment, buffer 142 is used by I/O controller 140 to temporarily retain data for transmission to or data received from an I/O device coupled to I/O bus 150. Specifically, if I/O controller 140 engages in repetitive transactions to poll devices coupled to I/O bus 150, and such an I/O device provides feedback indicating that it has data to transmit to controller 140, then buffer 142 may be used to temporarily store such data, thereby precluding an immediate need for I/O controller 140 to access memory 132. In one variation of this embodiment, at least a portion of buffer 142 is organized such that a specific location within buffer 142 is meant to be allocated for data corresponding to each I/O device coupled to I/O bus 150 or for each transaction to be repetitively carried out by I/O controller 140 on I/O bus 150. In another variation of this embodiment, at least a portion of buffer 142 is allocated to serve as a common data area for use in data transfers involving more than one I/O device coupled to I/O bus 150 or for more than one repetitive transaction to be carried out by I/O controller 140 on I/O bus 150, and a protocol entailing the use of codes is employed to identify which I/O device and/or which repetitive transaction corresponds to the data stored in that portion of buffer 142 at any given time.

In one embodiment, I/O bus 150 is a serial bus designed primarily for the attachment to computer system 100 of devices external to the chassis of a computer system (chassis not shown). In this embodiment, I/O bus 150 may use differential signaling and may be configured to allow power to be supplied by computer system 100 to one or more of the external peripheral devices. Also, in this embodiment, I/O controller 140 may initiate opportunities for the transfer of data or other transaction on I/O bus 150 by the transmission of a command on a regularly timed basis, such as once every millisecond (called a "frame") and/or 125 microseconds (called a "microframe"). Furthermore, in this embodiment, I/O bus 150 may be configured to allow the hot-plugging of external peripheral devices to computer system 100, and I/O controller 140 may repetitively poll I/O devices attached to ascertain the absence and/or presence of one or more I/O devices. Still further, in this embodiment, I/O bus 150 may be configured such that normal operation requires that I/O controller 140 be the initiator of all transfers of commands and/or data via I/O bus 150.

In another embodiment, I/O bus 150 is a parallel bus designed primarily for the attachment to computer system 100 of data storage devices. In this embodiment, I/O bus 150 may use differential signaling and may be configured to allow power for termination of I/O bus 150 to be supplied by computer system 100. Also, in this embodiment, I/O bus 150 may be configured to allow the hot-plugging of external peripheral devices to computer system 100, and I/O controller 140 may repetitively poll I/O devices attached to ascertain the absence and/or presence of one or more I/O devices.

In one specific embodiment, I/O bus 150 is configured to conform to the specification widely known as the Universal Serial Bus, or USB. In another specific embodiment, I/O bus 150 is configured to conform to the specification widely known as the small computer storage interface, or SCSI. In still other specific embodiments, I/O bus 150 is configured to conform to specifications known widely as RS-232, I2C or IEEE-1284.

In one embodiment, I/O controller 140 may be configured to be programmable such that bits in a register or other mechanisms are used to enable or disable the use of buffer 142 for maintaining a copy of the data maintained within memory 132. This ability to enable or disable this function may be used in concert with other power management features of computer system 200, including whether or not processor 110 or memory 132 are configured to be powered down, and under what circumstances.

Figure 2:
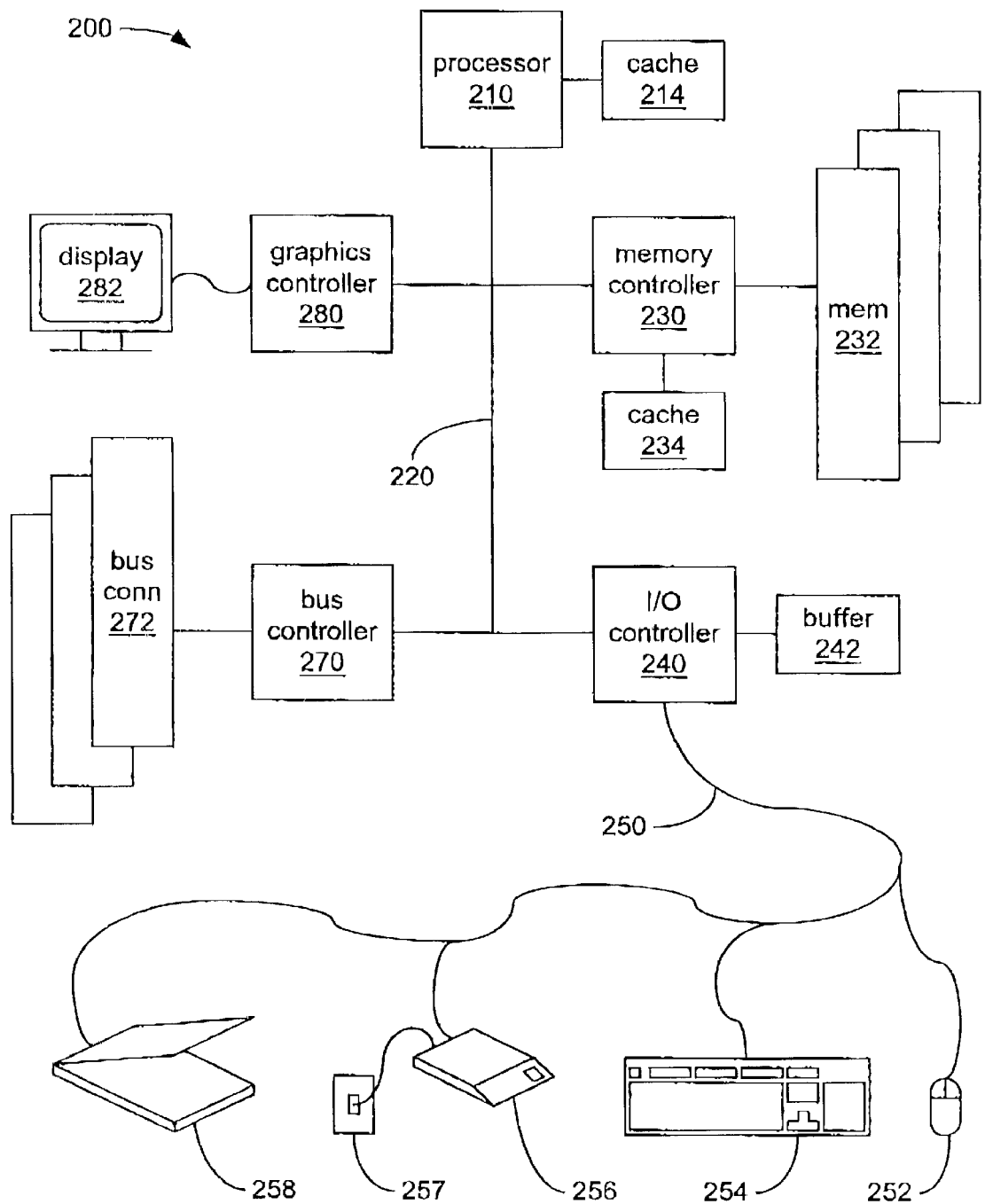
FIG. 2 is a block diagram of another embodiment of the present invention.

FIG. 2 depicts a block diagram of another embodiment of the present invention in the form of computer system 200. In a manner largely corresponding to computer system 100 of FIG. 1, processor 210 is coupled via local bus 220 to memory controller 230, I/O controller 240, bus controller 270 and graphics controller 280. Processor 210 is further coupled to cache 214, memory controller 230 is further coupled to both memory 232 and cache 234, I/O controller 240 is further coupled to both buffer 242 and I/O bus 250, bus controller 270 is further coupled to bus connectors 272, and graphics controller 280 is further coupled to display 282. In turn, I/O bus 250 couples I/O controller 240 to various I/O devices or a wide variety, but which have been depicted in FIG. 2 to include mouse 252, keyboard 254, modem 256 (which is further coupled to phone jack 257), and scanner 258.

Also, as previously discussed with regard to computer system 100 of FIG. 1, processor 210, memory controller 230 and I/O controller 240 of computer system 200 of FIG. 2 may be coupled together in any of a number of configurations of local busses and may be implemented in any of a number of combinations of integrated circuit not depicted. Furthermore, memory 232 may be implemented using any of a number of widely available forms of random access memory based on any of a number of semiconductor technologies.

However, in one embodiment of computer system 200 that varies from computer system 100 of FIG. 1, memory controller 230 maintains a copy of a frequently changing subset of the data stored in memory 232 in cache 234. Cache 234 may be static random access memory, or may be based on other forms of storage technology meant to be in some way faster in response to accesses made to retrieve data than memory 232. At various times when processor 210 or another component of computer system 200 performs an access to memory 232, memory controller 230 may intercede and retrieve the desired data from cache 234 in less time than would be possible to retrieve it from memory 232, thereby allowing the access to be completed more quickly. In another embodiment of computer system 200 that varies from computer system 100 of FIG. 1, processor 210 maintains a copy of a frequently changing subset of the data stored in memory 232 in cache 214. Like cache 234, cache 214 allows the retrieval of data more quickly than may be possible from memory 232. However, unlike cache 234, cache 214 is embedded within processor 214, and may not be accessible to other components of computer system 200. Where processor 214 must retrieve data from memory 232, it may be possible to perform the retrieval of data more quickly by retrieving it from cache 214. In still another embodiment of computer system 200 that varies from computer system 100 of FIG. 1, both caches 214 and 234 are provided. Caches 214 and/or 234 may be configured to operate under any of a number of widely known algorithms for prefetching data from memory 232.

In a manner also largely corresponding to computer system 100 of FIG. 1, I/O controller 240 provides an interface between I/O devices coupled to I/O bus 250 and the rest of computer system 200. In various embodiments, I/O controller 240 may be a microprocessor, microcontroller or sequencer executing a sequence of instructions. During normal operation of I/O bus 250, I/O controller 240 repetitively performs a transaction on I/O bus 250 such as polling I/O devices coupled to I/O bus 250. Data concerning each of the I/O devices coupled to I/O bus 250 is maintained within memory 232, thereby making it accessible to processor 210, and at least a portion of this data needs to be accessed by I/O controller 240 in performing this repetitive polling or other repetitive transaction. However, buffer 242 maintains a copy of a subset of this data.

In one embodiment, the copy of data maintained by buffer 242 may be comprised of information concerning the status of one or more I/O devices coupled to I/O bus 250 and/or information concerning appropriate actions to be taken in response to various types of feedback provided by one or more I/O devices coupled to I/O bus 250 being polled by I/O controller 240. In this embodiment, the copy of data may be sufficient to allow I/O controller 240 to perform polling of I/O devices coupled to I/O bus 250 and to take appropriate actions in response to a polled I/O device indicating that nothing has changed without I/O controller 240 accessing memory 232. Alternatively, in this embodiment, the data may be sufficient to allow I/O controller 240 to take appropriate actions in response to a select number of possible indications of change of status provided by an I/O device that has been polled without I/O controller 240 accessing memory 232.

Maintaining a copy of data concerning I/O devices coupled to bus 250 in buffer 242 allows the number accesses that I/O controller 140 makes to memory 232 to be reduced. This reduction in accesses may, in turn, allow memory 232 to be powered down at times where memory 232 would otherwise have to be powered up to allow I/O controller 240 to make such accesses. In an embodiment of computer system 200 that is further comprised of cache 234, this reduction in accesses may also allow cache 234 to remain powered down along with memory 232 at times where cache 234 would otherwise have to be powered up to either respond to accesses being made by I/O controller 140, or to take steps necessary to maintain coherency between data stored in cache 234 and memory 232. In another embodiment of computer system 200 that is further comprised of cache 214, this reduction in accesses may also allow cache 214 to remain powered down, which may in turn, allow processor 210 to remain powered down at times where it would otherwise be necessary to be powered up in order to maintain coherency between data stored in cache 214 and memory 232. In still another embodiment of computer system 200, both caches 214 and 234 are present, either processor 210 or memory 232 and their associated caches may be powered down during the normal operation of computer system 200, as determined to be appropriate as part of whatever measures are being taken to reduce power consumption by computer system 200. In such an embodiment, the reduction in accesses to memory 232 would allow whichever ones of processor 210 or memory 232 and their associated caches to remain powered down.

Depending on the quantity and/or type of data maintained within buffer 242, I/O controller 240 may be able to respond to a variety of types of feedback from I/O devices coupled to I/O bus 250 without having to access memory 232. In one embodiment, I/O controller 240 may be able to receive feedback from an I/O device coupled to bus 250 that requires changes to be made to this data, but may be configured to defer making accesses to memory 232 to update the contents of memory 232 until some later time. Such a deferral of updating memory 232 may allow either of caches 214 and/or 234 that may be present in various variations of this embodiment to remain powered down, along with memory 232, since the deferral of updating memory 232 will also result in the deferral of taking steps to maintain the coherency of either caches 214 and/or 234. Such a deferral may be brought to an end by a predetermined event within computer system 200, such as a component of computer system 200 powering up in response to some external stimulus. In an alternate embodiment, the quantity and/or type of data maintained be configured to be sufficient such that I/O controller 240 need only access memory 232 when an I/O device coupled to I/O bus 250 must be supplied with data and/or has data to supply to computer system 200. In such an embodiment, it may be possible to preclude taking steps to maintain coherency between either of caches 214 and/or 234 that may be present in various variations of this embodiment, except where an I/O device coupled to I/O bus 250 has data to supply to computer system 200.

More specifically, in various embodiments, at least a portion of buffer 242 may be allocated and divided into cells in a manner that corresponds to the earlier extensive of FIG. 1, with each cell being intended to correspond to an I/O device coupled to I/O bus 250 and/or to a repetitive transaction to be carried out by I/O controller 240 on I/O bus 250. Alternatively, or in addition, at least a portion of buffer 242 may be allocated to serve as temporary storage for data to be transmitted to or data received from I/O devices coupled to I/O bus 250.

In one embodiment, I/O bus 250 is a serial bus designed primarily for the attachment to computer system 200 of devices external to the chassis of a computer system (chassis not shown). In this embodiment, I/O bus 250 may use differential signaling and may be configured to allow power to be supplied by computer system 200 to one or more of the external peripheral devices. Also, in this embodiment, I/O controller 240 may initiate opportunities for the transfer of data or other transaction on I/O bus 250 by the transmission of a command on a regularly timed basis, such as once every millisecond (called a "frame") and/or every 125 microseconds (called a "microframe"). Furthermore, in this embodiment, I/O bus 250 may be configured to allow the hot-plugging of external peripheral devices to computer system 200, and I/O controller 240 may repetitively poll I/O devices attached to ascertain the absence and/or presence of one or more I/O devices. In performing this polling, I/O controller 240 may use buffer 242 to maintain a record of previous instances of the absence or presence of I/O devices, and although that record may be a copy of data stored in memory 232, I/O controller 240 may update the copy maintained within buffer 242, while deferring the updating of data stored in memory 232 until a later time. The occurrence of such a later time may be the powering up of one or more components of computer system 200 as a result of some event to which another component of computer system 200 is responding. Still further, in this embodiment, I/O bus 250 may be configured such that normal operation requires that I/O controller 240 be the initiator of all transfers of commands and/or data via I/O bus 250.

In another embodiment, I/O bus 250 is a parallel bus designed primarily for the attachment to computer system 200 of data storage devices. In this embodiment, I/O bus 250 may use differential signaling and may be configured to allow power for termination of I/O bus 250 to be supplied by computer system 100. Also, in this embodiment, I/O bus 250 may be configured to allow the hot-plugging of external peripheral devices to computer system 200, and I/O controller 240 may repetitively poll I/O devices attached to ascertain the absence and/or presence of one or more I/O devices. In performing this polling, I/O controller 240 may use buffer 242 to maintain a record of previous instances of the absence or presence of I/O devices.

In one specific embodiment, I/O bus 250 is configured to conform to the specification widely known as the Universal Serial Bus, or USB. In another specific embodiment, I/O bus 250 is configured to conform to the specification widely known as the small computer storage interface, or SCSI. In still other specific embodiments, I/O bus 250 is configured to conform to specifications known widely as RS-232, I2C or IEEE-1284.

In one embodiment, I/O controller 240 may be configured to be programmable such that bits in a register or other mechanisms are used to enable or disable the use of buffer 242 for maintaining a copy of the data maintained within memory 232. This ability to enable or disable this function may be used in concert with other power management features of computer system 200, including whether or not processor 210, memory 232, or caches 214 or 234 are configured to be powered down, and under what circumstances.

Figure 3:
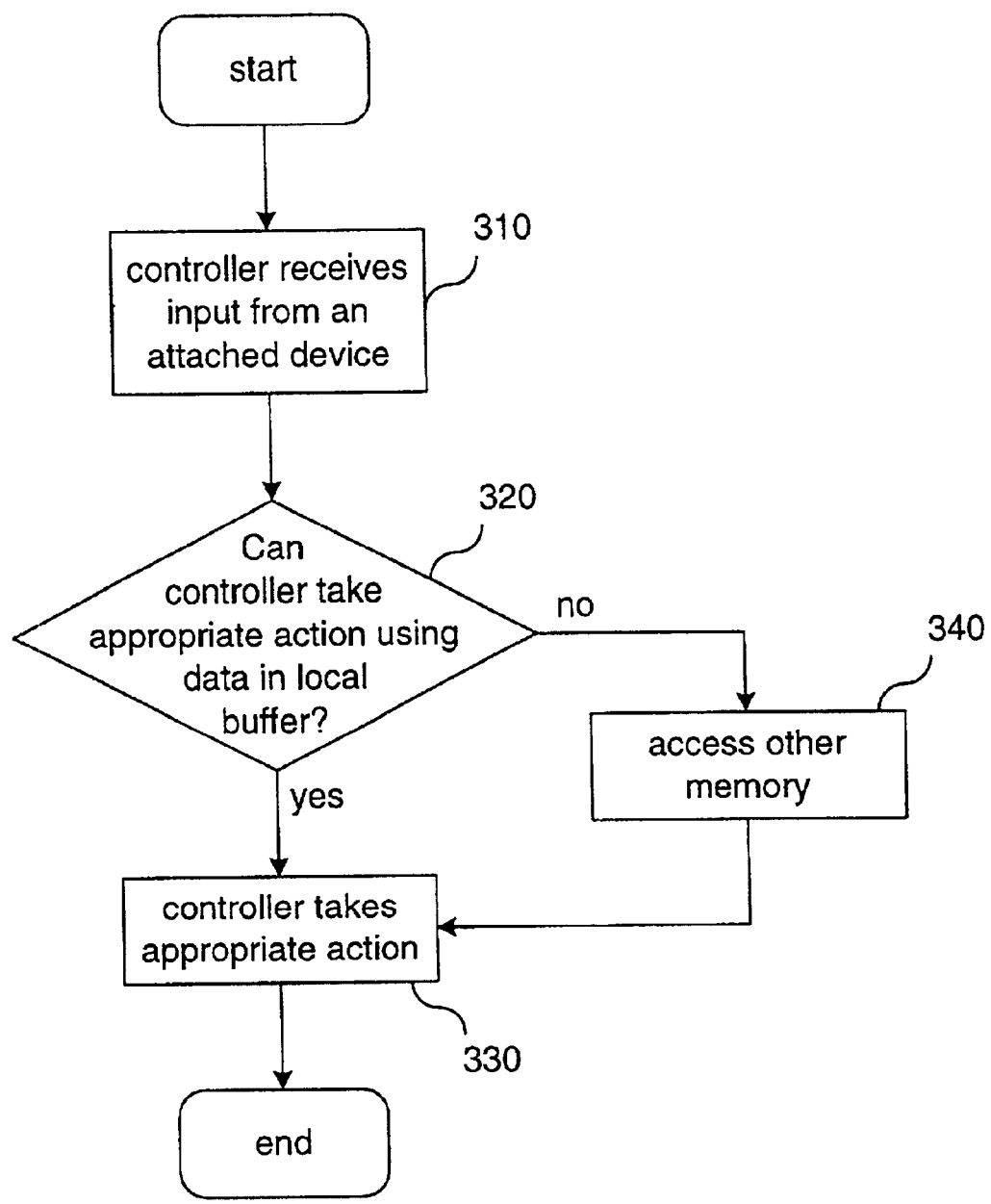
FIG. 3 is a flow chart of still another embodiment of the present invention.

FIG. 3 is a flowchart of still another embodiment of the present invention. A controller receives input from a device coupled to the controller via a bus at 310 as a result of the controller having carried out at least one instance of a repetitive transaction. At 320, the controller decodes the input, and a determination is made as to whether or not the local buffer of the controller, which contains a subset of data about the device that is maintained in other memory, has enough data to allow the controller to take appropriate action in response to the input without accessing the other memory. If the subset of data maintained by the local buffer is sufficient, then at 330, the controller takes the appropriate action. However, if the subset of data maintained by the local buffer is not sufficient, then at 340, the controller makes an access to the other memory to either retrieve data from the other memory or to write data to it. After accessing the other memory, the controller then takes appropriate action.

In one embodiment, making the access to the other memory at 340 requires the other memory to be powered up to enable the access to be made. In another embodiment, making the access to the other memory at 340 requires powering up both the other memory and a cache normally used to allow speedier retrieval of data than is possible from the other memory. The powering up of the cache may be required to maintain coherency between the cache and the memory. Depending on the algorithm used to control the cache, maintaining coherency may require copying data transferred between the controller and the other memory into the cache, or it may require invalidating a portion of the data maintained within the cache if the controller writes data into the other memory. If the cache is incorporated within a processor separate from the controller, then powering up the cache may require powering up the processor.

The invention has been described in conjunction with the preferred embodiment. It is evident that numerous alternatives, modifications, variations and uses will be apparent to those skilled in the art in light of the foregoing description. It will be understood by those skilled in the art that the present invention may be practiced in support reducing power consumption of various electrical and/or electronic systems including, but not limited to, computer systems, embedded controller devices within appliances and vehicles, control systems used in homes, and router and/or switching controllers used in networking and/or other communications systems. It will also be understood that the present invention may be practiced in support of any electronic system having a bus to which are attached devices that require frequent monitoring by way of performing repetitive transactions including, but not limited to assembly line and process control systems, arrays of sensors used to collect data in scientific and other pursuits, and systems used to monitor safety and/or security in various environments, including factory floors and buildings. Finally, although the present invention has been depicted with an implementation of a computer system where I/O devices external to a computer system are being monitored by an I/O controller, it will be appreciated that these devices may be internal circuits monitoring various aspects of the computer system, itself, including temperatures, fan speeds, power levels, etc.

What is claimed is:

1. A computer system, comprising:
   a memory to maintain a first set of data;
   a processor coupled to the memory such that the processor has access to the first set of data;
   an I/O bus; and
   an I/O controller that is coupled to the memory such that the I/O controller also has access to the first set of data, coupled to the I/O bus, is further coupled to a buffer to maintain a second set of data that is comprised of a copy of at least a portion of the first set of data, and uses the second set of data without accessing the first set of data to perform at least one repetitive transaction on the I/O bus, allowing the memory to be powered down during the at least one repetitive transaction.

2. A computer system, comprising:
   a memory to maintain a first set of data;
   a processor coupled to the memory such that the processor has access to the first set of data;
   an I/O bus that permits at least one I/O device to be coupled or uncoupled to the I/O bus while the computer system is in operation; and
   an I/O controller that is coupled to the memory such that the I/O controller also has access to the first set of data, is also coupled to the I/O bus, is further coupled to a buffer to maintain a second set of data that is comprised of a copy of at least a portion of the first set of data, and performs at least one instance of a repetitive transaction to ascertain what I/O devices are coupled to the I/O bus.

3. A computer system, comprising:
   a memory to maintain a first set of data;
   a processor coupled to the memory such that the processor has access to the first set of data;
   an I/O bus; and
   an I/O controller that is coupled to the memory such that the I/O controller also has access to the first set of data, coupled to the I/O bus, is further coupled to a buffer to maintain a second set of data that is comprised of a copy of at least a portion of the first set of data, and defers making an access to update the first set of data in response to feedback received from an I/O device coupled to the I/O bus until the memory is powered up in response to an event unrelated to the feedback received from the I/O device.

4. An apparatus, comprising:
   a first interface to an I/O bus;
   a second interface to a memory to maintain a first set of data;

a local buffer to maintain a second set of data comprised of a copy of at least a portion of the first set of data, wherein the second set of data is used without accessing the first set of data to carry out at least one instance of a repetitive transaction on the I/O bus, allowing the memory to be powered down during at least one repetitive transaction; and controlling circuitry to perform transactions on the I/O bus, the controlling circuitry being coupled to the local buffer and the first and second interfaces.

5. An apparatus, comprising:

a first interface to an I/O bus;

a second interface to a memory to maintain a first set of data;

a local buffer to maintain a second set of data comprised of a copy of at least a portion of the first set of data; and controlling circuitry to perform transactions on the I/O bus, wherein the I/O bus permits at least one I/O device to be coupled or uncoupled to the I/O bus while the controlling circuitry is in operation, the controlling circuitry being coupled to the local buffer and the first and second interfaces, and wherein the controlling circuitry performs at least one instance of a repetitive transaction to ascertain what I/O devices are coupled to the I/O bus.

6. An apparatus, comprising:

a first interface to an I/O bus;

a second interface to a memory to maintain a first set of data;

a local buffer to maintain a second set of data comprised of a copy of at least a portion of the first set of data; and controlling circuitry to perform transactions on the I/O bus, the controlling circuitry being coupled to the local buffer and the first and second interfaces, wherein an access to update the first set of data in response to feedback received from an I/O device coupled to the I/O bus is deferred until the memory is powered up in response to an event unrelated to the feedback received from the I/O device.

7. The computer system of claim 1, wherein a first cache is coupled to the memory, the first cache may respond in lieu of the memory to a request made by the I/O controller for data from memory, and the I/O controller uses the second set of data to allow the first cache to be powered down along with the memory.

8. The computer system of claim 1, wherein a second cache is coupled to the processor, the second cache may respond in lieu of the memory to a request made by the processor for data from memory, and the I/O controller uses the second set of data to allow the second cache to be powered down along with the processor.

9. The computer system of claim 2, wherein the second set of data is comprised of data to allow the I/O controller to take action without making an access to the memory in response to feedback from an I/O device indicating that the I/O device is coupled to the I/O bus.

10. The computer system of claim 2, wherein the I/O bus is a serial bus and supplies power from the computer system to at least one I/O device coupled to the I/O bus.

11. The computer system of claim 2, wherein the I/O bus is a parallel bus and supplies power from the computer system for terminating at least one signal conductor of the I/O bus.

12. The computer system of claim 4, wherein a first cache is coupled to the memory, the first cache may respond in lieu of the memory to a request made by the controlling circuitry for data from memory, and the controlling circuitry uses the second set of data to allow the first cache to be powered down along with the memory.

13. The computer system of claim 4, wherein a second cache is coupled to the processor, the second cache may respond in lieu of the memory to a request made by the processor for data from memory, and the controlling circuitry uses the second set of data to allow the second cache to be powered down along with the processor.

14. The apparatus of claim 5, wherein the second data is comprised of data to allow the controlling circuitry to take action without making an access to the memory in response to feedback from an I/O device indicating that the I/O device is coupled to the I/O bus.

15. The apparatus of claim 5, wherein the I/O bus is a serial bus and supplies power from the computer system to at least one I/O device coupled to the I/O bus.

16. The apparatus of claim 5, wherein the I/O bus is a parallel bus and supplies power from the computer system for terminating at least one signal conductor of the I/O bus.

17. A method, comprising:

copying at least a portion of a first set of data maintained in a memory and storing the copy as a second set of data in a local buffer;

powering down the memory;

performing at least one instance of a repetitive transaction on an I/O bus;

receiving a feedback from an I/O device coupled to the I/O bus in response to the at least one instance of a repetitive transaction; and using the second set of data in the local buffer to take an action in response to the feedback without making an access to the memory, allowing the memory to be powered down.

18. The method of claim 17, wherein the first set of data and the second set of data are comprised of data concerning the I/O device coupled to the I/O bus.

19. The method of claim 17, wherein the at least one instance of a repetitive transaction is a polling of the I/O bus to ascertain the coupling or uncoupling of at least one I/O device on the I/O bus.

20. The method of claim 17, wherein the feedback from the I/O device coupled to the I/O bus indicates that there is no change in status in the I/O device since a previous instance of the repetitive transaction.

21. A method, comprising:

copying at least a portion of a first set of data maintained in a memory and storing the copy as a second set of data in a local buffer;

powering down the memory;

performing at least one instance of a repetitive transaction on an I/O bus;

receiving a feedback from an I/O device coupled to the I/O bus in response to the at least one instance of a repetitive transaction;

using the second set of data in the local buffer to take an action in response to the feedback; and waiting to make an access to the memory until another event unrelated to the feedback from the I/O device causes the memory to be powered up.

22. The method of claim 21, wherein the first set of data and the second set of data are comprised of data concerning the I/O device coupled to the I/O bus.

23. The method of claim 21, wherein the at least one instance of a repetitive transaction is a polling of the I/O bus to ascertain the coupling or uncoupling of at least one I/O device on the I/O bus.

24. The method of claim 17, wherein the feedback from the I/O device coupled to the I/O bus indicates that there has been a change in status in the I/O device since a previous instance of the repetitive transaction.

25. A computer-readable medium containing a sequence of instructions, which when executed cause an I/O controller to:

copy at least a portion of a first set of data maintained in a memory and store the copy as a second set of data in a local buffer;

perform at least one instance of a repetitive transaction on an I/O bus;

receive a feedback from an I/O device coupled to the I/O bus in response to the at least one instance of a repetitive transaction; and use the second set of data in the local buffer to take an action in response to the feedback without making an access to the memory, allowing the memory to be powered down.

26. The computer readable medium of claim 25, wherein the I/O controller is comprised of a sequencer.

27. A computer-readable medium containing a sequence of instructions, which when executed cause an I/O controller to:

copy at least a portion of a first set of data maintained in a memory and store the copy as a second set of data in a local buffer;

perform at least one instance of a repetitive transaction on an I/O bus;

receive a feedback from an I/O device coupled to the I/O bus in response to the at least one instance of a repetitive transaction;

use the second set of data in the local buffer to take an action in response to the feedback; and wait to make an access to the memory until another event unrelated to the feedback from the I/O device causes the memory to be powered up.

28. The computer readable medium of claim 27, wherein the I/O controller is comprised of a sequencer.

* * * * *